United States Patent [19]
Funakoshi et al.

[11] Patent Number: 5,993,773
[45] Date of Patent: Nov. 30, 1999

[54] LOW-SILICA FAUJASITE TYPE ZEOLITE AND METHOD FOR PRODUCING THE SAME

[75] Inventors: Hajime Funakoshi; Yoshinori Shirakura, both of Yamaguchi, Japan

[73] Assignee: Tosoh Corporation, Yamaguchi, Japan

[21] Appl. No.: 09/198,601

[22] Filed: Nov. 24, 1998

[30] Foreign Application Priority Data

Nov. 27, 1997 [JP] Japan .................................. 9-325846
May 18, 1998 [JP] Japan .................................. 10-151902

[51] Int. Cl.$^6$ .................................................. C01B 39/22
[52] U.S. Cl. ........................ 423/709; 423/710; 423/711; 423/716; 423/DIG. 21
[58] Field of Search .................................. 423/700, 709, 423/710, 711, 716, DIG. 21; 502/79

[56] References Cited

U.S. PATENT DOCUMENTS

| | | | |
|---|---|---|---|
| 3,313,594 | 4/1967 | Wilson, Jr. ...................... | 423/DIG. 21 |
| 3,321,272 | 5/1967 | Kerr . | |
| 3,359,068 | 12/1967 | Mishalko ........................ | 423/DIG. 21 |
| 3,808,326 | 4/1974 | McDaniel et al. ...................... | 423/709 |
| 4,007,253 | 2/1977 | Puppe et al. . | |
| 4,166,099 | 8/1979 | McDaniel et al. . | |
| 4,173,622 | 11/1979 | Robertson . | |
| 4,175,059 | 11/1979 | Edwards et al. ........................... | 502/65 |
| 4,222,995 | 9/1980 | Roebke et al. ........................... | 423/714 |
| 4,400,366 | 8/1983 | Sanders .................................... | 423/709 |
| 4,406,822 | 9/1983 | Sanders et al. ........................... | 502/67 |
| 4,606,899 | 8/1986 | Butter et al. .............................. | 423/709 |
| 5,487,882 | 1/1996 | Hu et al. .................................. | 423/700 |
| 5,645,811 | 7/1997 | Kuhm et al. ............................. | 423/700 |
| 5,908,823 | 6/1999 | Zatta et al. ............................... | 423/710 |

FOREIGN PATENT DOCUMENTS 0 196 078  10/1986  European Pat. Off. .
24 47 206   4/1976  Germany .

OTHER PUBLICATIONS

Kühl, Günter Crystallization Of Low–Silica Faujasite (SI02/AL203–2.0) Zeolites vol. 7, Sep. 1, 1987, pp. 451–457.

*Primary Examiner*—Mark L. Bell
*Assistant Examiner*—David Sample
*Attorney, Agent, or Firm*—Sughrue, Mion, Zinn, Macpeak & Seas, PLLC

[57] ABSTRACT

Disclosed are high purity low-silica faujasite type zeolite showing a faujasite single phase on X-ray diffraction, having a $SiO_2/Al_2O_3$ molar ratio of 1.9 to 2.1 and a water adsorption of 35.0% by weight or more when converted to the Na type, and comprising particles having smaller primary particle size and particles having larger primary particle size, wherein the primary particle size of the smaller particles is from 1 $\mu$m to 8 $\mu$m, the primary particle size of the larger particles is from 5 $\mu$m to 15 $\mu$m, and the particles having smaller primary particle size accounts for 90% or more of the total particle number; and a method for producing low-silica faujasite type zeolite having a $SiO_2/Al_2O_3$ molar ratio of 1.9 to 2.1 by mixing an aluminate-containing solution with a silicate-containing solution to allow the resulting solution to gel, followed by aging and crystallization, wherein besides zeolite formed, "zeolite" is added before the termination of the aging, thereby producing the low-silica faujasite type zeolite in high purity on a large scale for a short period of time.

9 Claims, 2 Drawing Sheets

LOW-SILICA FAUJASITE TYPE ZEOLITE AND METHOD FOR PRODUCING THE SAME

FIELD OF THE INVENTION

The present invention relates to low-silica faujasite type zeolite having a $SiO_2/Al_2O_3$ molar ratio of 1.9 to 2.1 which is excellent in gas adsorbability, particularly in nitrogen adsorbability, and useful as a base agent for a zeolite adsorption separator separating and concentrating oxygen from a mixed gas of oxygen and nitrogen by the adsorption method, and a method for producing the same.

BACKGROUND OF THE INVENTION

As to methods for producing low-silica faujasite type zeolite (hereinafter also referred to as "LSX") having a $SiO_2/Al_2O_3$ molar ratio of 1.9 to 2.1, various methods have been disclosed. For example, GB 1580928 discloses a method of crystallizing a mixture containing sodium, potassium, an aluminate and a silicate at a temperature of 50° C. or less, or aging the mixture at a temperature of 50° C. or less for an extremely long time of 15 to 72 hours, followed by crystallization within the temperature range of 60 to 100° C.

ZEOLITES, vol. 7, September, pages 451–457 (1987) discloses the influence of the $SiO_2/Al_2O_3$ molar ratio, K/(Na+K) molar ratio, aging conditions and crystallization conditions of raw materials on the formation of low-silica faujasite type zeolite in detail, and the aging and crystallization are performed in a plastic vessel.

Further, U.S. Pat. No. 4,859,217 discloses a method of mixing a mixture containing sodium, potassium and an aluminate with a mixture containing a silicate at a low temperature of 4 to 12° C. to allow the resulting mixture to gel, aging the gel at 36° C. for 48 hours, and then elevating the temperature thereof to 70° C. to conduct crystallization, and it is clearly shown that the cooling in the final mixing and the avoidance of the occurrence of excessive mechanical energy are important.

As described above, in the production of low-silica faujasite type zeolite, it has been considered indispensable that the solution containing sodium, potassium, an aluminate and a silicate is mixed it low temperature to allow the solution to gel, the gel is aged in the still standing state for a long period of time, and the temperature thereof is elevated to the crystallization temperature in the still standing state to conduct crystallization. However, it is industrially disadvantageous to cool the raw material to low temperature, and the gel is very poor in heat transfer characteristics. In large-scale synthesis, therefore, there is the difficulty that an extremely large period of time is required for homogenizing the temperature in the still standing state.

SUMMARY OF THE INVENTION

Taking into account the above-mentioned background, tnerefore objects of the present invention are to provide high purity LSX, and to provide a method for synthesizing high purity LSX in a short period of time, particularly a method for synthesizing high purity LSX on a large scale in a short period of time.

As a result of intensive investigation on methods for synthesizing high purity LSX continuously and stably on a large scale, the present inventors have discovered that in a method for producing LSX having a $SiO_2/Al_2O_3$ molar ratio of 1.9 to 2.1 by mixing an aluminate-containing solution with a silicate-containing solution to allow the resulting solution to gel, followed by aging and crystallization, the time required for the aging can be shortened by adding zeolite, besides LSX formed, to a reaction vessel, so that LSX having high purity and a peculiar primary particle size distribution can be synthesized in an extremely short period of time, and LSX can be produced on a large scale by this method. Further, the present inventors have discovered that the addition of faujasite type zeolite or A type zeolite is significantly effective, and that the addition of zeolite in gelling after the mixing of the aluminate-containing solution with the silicate-containing solution or in aging gel formed is more effective. Moreover, the present inventors have discovered that the above-mentioned effect of enhancing the formation of LSX using a zeolite shows a completely reverse tendency to the conventional information that "aging and crystallization are performed in the still standing state or a nearly still standing state", that is to say, the more strongly stirring is conducted during the aging, the easier the formation of LSX becomes, making it possible to obtain LSX in a short aging time, which has been considered to be impossible in the prior art, and have further discovered that the synthesis at high concentrations which has been considered to be impossible in the prior art becomes possible.

The $SiO_2/Al_2O_3$ molar ratio of low-silica faujasite type zeolite of the present invention is theoretically 2.0. However, with the consideration of the measurement error in the chemical composition analysis, it is clear that low-silica faujasite type zeolite having a molar ratio of 1.9 to 2.1 is within the scope of the present invention.

In this specification, zeolite to be added besides LSX produced in methods for producing LSX is simply represented by "zeolite" or "zeolite to be added".

DETAILED DESCRIPTION OF THE INVENTION

The present invention will be described in greater detail below.

The first aspect of the present invention is directed to LSX having extremely high purity and characterized by primary particle size. That is to say, there is provided high purity low-silica faujasite type zeolite showing a faujasite single phase on X-ray diffraction, having a $SiO_2/Al_2O_3$ molar ratio of 1.9 to 2.1 and a water adsorption or 35.0% of more when converted to the Na type, and comprising particles having smaller primary particle size and particles having larger primary particle size, wherein the primary particle size of the smaller particles is from 1 $\mu$m to 8 $\mu$m, the primary particle size of the larger particles is from 5 $\mu$m to 15 $\mu$m, and the particles having smaller primary particle size account for 90% or more of the total particle number.

X-ray diffraction is generally used for determining the purity of zeolite. Impurities formed as by-products in synthesizing LSX include A type zeolite, sodalite, F type zeolite described in Breck, *Zeolite Molecular Sieves*, page 144, Krieger (1974) and E type zeolite described in ibid., page 356. One of the features of the high purity LSX of the present invention is to show a faujasite single phase on X-ray diffraction and not to contain the above-mentioned impurities.

However, the poor crystallinity of the impurities or the presence of trace amounts of the plural impurities results in no appearance of peaks of the impurities on X-ray diffraction, even when the purity is slightly lowered. It is therefore just one of the necessary conditions for characterizing high purity to show a faujasite single phase on X-ray diffraction.

On the other hand, the water adsorption of pure zeolite shows a constant value depending on the kind of zeolite and the kind of its cation. For example, A type zeolite of the Na type adsorbs 28 g of water based on 100 g of zeolite, and F type zeolite of the Na type adsorbs 27 g of water based on 100 g of zeolite. LSX of the Na type adsorbs 36 g of water based on 100 g of zeolite, and the water adsorption thereof is larger than that of zeolite liable to be formed as an impurity. It is therefore possible to estimate the purity of synthesized LSX on the basis of the water adsorption thereof. The high purity LSX of the present invention is characterized by not only showing a faujasite single phase on X-ray diffraction, but also showing a water adsorption of 35.0% or more, preferably 35.5% or more, when used as the Na type.

When observed under an SEM, zeolite is present as a primary particle alone which is the minimum unit of zeolite, or as a secondary particle formed by coagulation of a plurality of primary particles. In general, the kind of zeolite determines the shape of the primary particle thereof. For example, the shape of A type zeolite is cubic, and faujasite type zeolite has an octahedral shape or a spherical polyhedral shape with edges developed.

Usually, the particle size of these particles has a distribution centered at a certain value. A method for determining an average particle size from particles having a distribution is described in detail in, for example, Sigeo Miwa, *Funtai Kogaku Tsuron (An Outline of Particle Technology)*, pages 1 to 30, published by Nikkan Kogyo Shinbunsha (1981).

In the present invention, the primary particle size is represented by an average value of diameters of primary particles of faujasite type zeolite observed under an SEM, the particles being approximated to spheres. The LSX of the present invention is characterized not only by high purity, but also a peculiar primary particle size distribution. The LSX of the present invention comprises particles having a smaller primary particle size and particles having a larger primary particle size, wherein the primary particle size of the smaller particles is from 1 $\mu$m to 8 $\mu$m, the primary particle size of the larger particles is from 5 $\mu$m to 15 $\mu$m, each has one peak, and the particles having a smaller primary particle size accounts for 90% or more of the total particle number.

LSX synthesized by the conventional methods has one peak although there are differences in the primary particle size and the width of distribution, and does not have two distributions, showing a primary particle size distribution different from that of the high purity LSX of the present invention.

In the present invention, the reason why the LSX having extremely high purity and a primary particle size different from that of the conventional LSX is obtained is not clear. However, it presumably arises from the synthesis process, that is to say, the synthesis of LSX by adding zeolite besides zeolite formed, before the termination of aging, in a method of mixing an aluminate-containing solution with a silicate-containing solution to allow the resulting solution to gel, followed by aging and crystallization.

The second aspect of the present invention is directed to a method for producing low-silica faujasite type zeolite having a $SiO_2/Al_2O_3$ molar ratio of 1.9 to 2.1 by mixing an aluminate-containing solution with a silicate-containing solution and allowing the resulting solution to gel, followed by aging and crystallization, wherein zeolite is added, besides zeolite formed, before the termination of aging.

In the present invention, as the method for producing the LSX by mixing the aluminate-containing solution with the silicate-containing solution and allowing the resulting solution to gel, followed by aging and crystallization, it is desirable to use a method of keeping the viscosity of a solution containing respective ions of sodium, potassium, an aluminate and a silicate so as to give a viscosity of 10 cp to 10,000 cp after the initiation of gelation, and aging the solution, followed by crystallization, or a method of mixing an aluminate-containing solution with a silicate-containing solution at a temperature of 20° C. to 60° C. to allow the resulting solution to gel, thereby preparing a slurry having a viscosity after the initiation of gelation of 10 cp to 10,000 cp, and aging the slurry, followed by crystallization, because it is difficult to synthesize LSX under industrially advantageous conditions under which the scale can be easily enlarged, by methods other than these methods.

The present inventors have studied for synthesizing LSX in a short period of time. As a result, the present inventors have discovered that surprisingly, high purity LSX can be synthesized in an extremely short period of time by adding zeolite, besides LSX formed, to a reaction vessel.

There is no particular limitation on the composition of zeolite used in the present invention, and LSX having a $SiO_2/Al_2O_3$ molar ratio of 1.9 to 2.1, X type zeolite having a $SiO_2/Al_2O_3$ molar ratio of about 2.5 and Y type zeolite having a $SiO_2/Al_2O_3$ molar ratio of 3.0 or more can all be used.

In the manufacturing process of the LSX, zeolite may be added at any time before the termination of aging. In particular, it is preferred that zeolite is added after the termination of gelation or at the beginning of the aging stage in aging the formed gel, because the aging time can be shortened by adding zeolite at these times.

Further, the present inventors have studied in detail the amount of faujasite type zeolite to be added. As a result, surprisingly, it has become clear that a very small amount of 0.001% by weight or more based on LSX formed can achieve its effect. Furthermore, the present inventors have discovered that the existence of the larger amount of faujasite type zeolite makes it possible to synthesize the high purity LSX in the shorter aging time. However, when the industrial production of LSX is considered, large-scale feeding equipment is required for allowing a large amount of faujasite type zeolite to exist. It is therefore impractical. The amount of faujasite type zeolite to be added is preferably from 0.001% to 10% by weight based on low-silica faujasite type zeolite formed. The term "the amount of LSX formed" as used herein means a theoretical amount derived from the assumption that 100% of LSX is formed from the amounts of aluminate and silicate in mixing the aluminate-containing solution with the silicate-containing solution.

Further, as a result of detailed studies with respect to the amount of A type zeolite to be added, surprisingly, it has become clear that a very small amount of 0.001% by weight or more based on LSX formed can achieve its effect. Furthermore, the present inventors have discovered that the presence of a larger amount of A type zeolite makes it possible to synthesize the high purity LSX in the shorter aging time. However, A type zeolite existing during aging is contained in LSX formed, so that the existence of a large amount of A type zeolite unfavorably results in a reduction in the purity of LSX finally obtained, by the existing amount of A type zeolite. The amount of A type zeolite to be added is preferably from 0.001% to 1% by weight.

Faujasite type zeolite and/or A type zeolite can both be added.

In addition, there is no particular limitation on a method for adding zeolite to a vessel for manufacturing LSX, and various methods can be used. Examples thereof include a method of preliminarily adding zeolite to either or both of the aluminate-containing solution and the silicate-containing solution which are raw materials, and allowing the resulting solution to gel, followed by aging, and a method of preliminarily adding zeolite to a reaction vessel, and mixing the aluminate-containing solution with the silicate-containing solution in the reaction vessel. When LSX is continuously synthesized, it is also possible to use a method of leaving a part of LSX previously formed in a reaction vessel, and mixing the aluminate-containing solution with the silicate-containing solution in the reaction vessel.

As a result of further studies, the present inventors have discovered that high purity LSX can be obtained more effectively by mixing the aluminate-containing solution with the silicate-containing solution, allowing the resulting solution to gel, and then adding zeolite, rather than by the above-mentioned methods, although the reason for this is not clear.

At this time, there is no particular limitation on a method for adding zeolite. Zeolite may be directly added in the powder form, or may be added after dispersal in water. Further, when LSX is continuously synthesized, a part of a slurry containing LSX already synthesized may be stored and added after gelation.

The aging may be carried out either in the still standing state or in the stirring state. However, for the object of the present invention, that is to say, for obtaining high purity LSX in a short aging time, it is necessary to carry out the aging in the stirring state. When the aging is carried out in the still standing state, the aging time required in the prior art becomes necessary for obtaining LSX having such a purity as obtained in the prior art. According to the conventional information, it has been considered that the aging and crystallization are required to be performed in the still standing state or a nearly still standing state. In the present invention, a complete reverse tendency to this information is observed, that is to say, the more strongly stirring is conducted during the aging, the easier the formation of LSX becomes, making it possible to obtain high purity LSX in a short aging time, for which the formation of high purity LSX has been considered to be impossible in the prior art. In the present invention, the stirring during the aging can be conducted by use of stirring blades such as propellers, turbines and paddles which are generally known. The stronger the stirring is, the better the result obtained. It is unfavorable that a slurry comes to stay at least partly in a reaction vessel. Specifically, the strength of stirring can be represented by "the power required for stirring per unit volume of slurry (unit: kW/m$^3$)" defined in chemical engineering. The strength of stirring required is at least 0.1 kW/m$^3$, preferably 0.2 kW/m$^3$, and more preferably 0.4 kW/m$^3$. Most preferably, it is desirable to conduct the stirring at 0.8 kW/m$^3$ or more which is referred to as strong stirring in chemical engineering. The stronger the stirring is, the better the result obtained. However, the strong stirring requires a high-powered motor. Accordingly, for example, about 3.0 kW/m$^3$ which is industrially available can be shown as the upper limit of the power required for stirring per unit volume of slurry.

In the present invention, it is impossible to unequivocally determine the aging time, because it varies depending on the aimed purity of LSX, the kind and amount of zeolite to be added, the timing of addition and the stirring strength during the aging. However, when consideration is given to the object of the present invention, that is to say, providing a method for synthesizing high purity LSX in a short aging time, a long aging time is meaningless. The aging time is preferably at most 24 hours, more preferably 15 hours or less, and most preferably 12 hours or less. According to the present invention, surprisingly, it becomes possible to synthesize extremely high purity LSX, depending on the kind and amount of zeolite to be added, the timing of addition and the stirring strength during the aging, even in a short aging time of 0.5 hour to 10 hours, for which the formation of high purity LSX has been considered to be impossible in the conventional synthesis of LSX.

There is no particular limitation on the aging time and aging temperature. However, too low a temperature unfavorably results in a long period of time necessary for the aging, whereas too high a temperature unfavorably results in the possibility of forming zeolite other than LSX. The specific aging temperature is preferably 20° C. to 70° C.

In the present invention, as the composition of the slurry subjected to the aging after the mixing of the aluminate-containing solution with the silicate-containing solution, for example, the following composition ranges described in GB 1580928 can be used.

| | |
|---|---|
| $SiO_2/Al_2O_3$ | 1.3–2.2 |
| $(Na_2O + K_2O)/SiO_2$ | 2.0–4.5 |
| $Na_2O/(Na_2O + K_2O)$ | 0.6–0.9 |
| $H_2O/(Na_2O + K_2O)$ | 10–35 |

However, according to the present invention, surprisingly, it is possible to produce high purity LSX, even if the composition partly deviates from these ranges. Specifically, it can be shown as a characteristic that the composition after the mixing of the aluminate-containing solution with the silicate-containing solution is 12.5% to 20% by weight in the concentration of low-silica faujasite theoretically formed. When the concentration of LSX theoretically formed is determined from the composition ranges shown in the prior art, it is usually about 8% to about 10% by weight, and at most about 12% by weight. In the present invention, LSX is considered to be formed even at a slurry concentration of 12.5% or more at which the formation of high purity LSX has conventionally been considered to be impossible, because zeolite is added besides zeolite formed during the aging. If the concentration of low-silica faujasite theoretically formed exceeds 20.0% by weight, the viscosity of the slurry is unfavorably increased to cause the great difficulty of stirring, resulting in easy formation of impurities.

With the consideration of industrial production of LSX, it is apparent that higher slurry concentration during the synthesis is preferred, because such higher concentration makes it possible to increase the amount of LSX produced per unit volume. Further, LSX is synthesized at high alkali concentration, so that LSX corresponding to the saturated solubility is dissolved in a mother liquor of the slurry after the termination of synthesis, which causes a reduction in a synthesis yield by the amount of the LSX dissolved. For example, when LSX is synthesized so as to give theoretically a concentration of 10% by weight, LSX actually obtained has a concentration of about 9.5% by weight, and the remaining about 0.5% by weight is dissolved in the mother liquor, although this varies according to the composition. When the slurry concentration is increased keeping the amount of the mother liquor and the alkali concentration constant, the amount of LSX dissolved in the mother liquor is constant. Accordingly, the relative yield can be improved. When LSX is synthesized so as to give theoretically a concentration of 16.5% by weight, the amount of LSX dissolved in the mother liquor is about 0.5% by weight. Accordingly, LSX actually obtained has a concentration of about 16.0% by weight. Although the synthesis yield is about 95% when the slurry concentration is 10% by weight, the yield is increased to about 97% when the slurry concentration is 16.5% by weight. It is therefore apparent that the present invention is industrially superior.

The temperature of the slurry aged for a specified period of time is then elevated to the crystallization temperature. LSX is easily formed from the slurry aged by the method of the present invention, and the temperature can be elevated by any method as long as it is generally known. In a laboratory, a reaction vessel may be heated together with a water bath on which the reaction vessel is placed, while continuing to stir the slurry, or by placing the reaction vessel in a dryer maintained at a specified temperature. Further, in a plant, the temperature can be elevated by a usual operation known in chemical engineering, for example, by passing steam or a heating medium through a heat exchanger such as a jacket attached to a reaction vessel, while continuing to stir the slurry for improving heat transfer. Furthermore, there is no particular limitation on the time required for temperature elevation. For example, the temperature is elevated for 0.5 hour to 5 hours.

LSX is easily formed from the slurry aged by the method of the present invention, and in the crystallization previously known still standing crystallization is not a necessary condition. The crystallization may be performed either with stirring or under still standing. When the crystallization was conducted with stirring, the primary particle size of LSX obtained was small, compared with that of LSX obtained by the still standing crystallization, although the reason for this is not clear. When consideration is given to the object of the present invention, that is to say, providing a method for synthesizing high purity LSX in a short period of time, either method may be employed. As the crystallization temperature, the crystallization temperature of previously known LSX, for example, a temperature of 60° C. to 100° C., can be used. Further, the crystallization is sufficiently performed for about 4 hours to about 12 hours, and a longer time may be taken, although it varies depending on the aging conditions, the composition and the crystallization temperature.

The high purity low-silica faujasite type zeolite having a $SiO_2/Al_2O_3$ molar ratio of 1.9 to 2.1 thus produced is filtered, washed and dried. As the methods of filtering, washing and drying, known methods can be used.

The LSX obtained by the present invention is formed into, for example, spherical or rod-like pellets by use of a clay binder, which is then ion-exchanged with Li ions or Ca ions, and activated, for example, at 400° C. for about 1 hour, thereby obtaining an adsorption separator having high adsorbability. This is excellent in gas adsorbability, particularly in nitrogen adsorbability, and therefore suitably used as a zeolite adsorption separator separating and concentrating oxygen from a mixed gas of oxygen and nitrogen by the adsorption method.

The present invention will be further illustrated in greater detail with reference to the following examples, which are, however, not to be construed as limiting the invention. Measuring methods employed in the examples are as follows:

(1) Measuring Method of Chemical Composition

A sample was dissolved by use of nitric acid and hydrofluoric acid, and thereafter, the amounts of Na, K, Al and Si were determined in terms of $Na_2O$, $K_2O$, $Al_2O_3$ and $SiO_2$, respectively, with an ICP emission analyzer (manufactured by PERKIN ELMER Co., type: OPTIMA 3000).

(2) Measuring Method of Crystal Structure

The crystal structure was measured with an X-ray diffractometer (manufactured by Mac Sciense Co., type: MXP-3).

(3) Measuring Method of Equilibrium Water Adsorption

A powder dried at 100° C. was allowed to stand in a desiccator having a relative humidity of 80% for 16 hours or more, and then, ignited at 900° C. for 1 hour. Taking the weight of the powder after water adsorption as $X_1$, and the weight thereof after ignition at 900° C. for 1 hour as $X_2$, the equilibrium water adsorption (%) was determined from the following equation:

Equilibrium water adsorption $(\%)=\{(X_1-X_2)/X_2\}\times 100$ (4) Ion-Exchanging Method to Na Type LSX LSX was ion-exchanged by the method described in ZEOLITES, vol. 7, September, page 456 (1987). A 1 mol/liter aqueous solution of sodium chloride prepared by adding sodium hydroxide to adjust the solution to pH 12 was added to LSX so as to give 1 mol of sodium chloride per mol of LSX, and ion exchange was conducted by a batch system at room temperature. This operation was repeated 5 times.

EXAMPLE 1

In a stainless reaction vessel having a content volume of 20 liters, 10,770 g of an aqueous solution of sodium silicate ($Na_2O$=3.8% by weight, $SiO_2$=12.6% by weight), 1,330 g of water, 1,310 g of sodium hydroxide (purity: 99%) and 3,630 g of an aqueous solution of potassium hydroxide for industrial use (purity: 48%) were placed, and kept at 45° C. in a water bath with stirring at 100 rpm. To this solution, 5,390 g of an aqueous solution of sodium aluminate ($Na_2O$=20.0% by weight, $Al_2O_3$=22.5% by weight) kept at 40° C. was added for one minute. From immediately after the addition, the resulting solution became clouded to initiate gelation. Immediately before the termination of the addition, the viscosity of the whole gel increased, and the slurry came to stay partly in an upper portion of the reaction vessel. However, after about 3 minutes, the whole was uniformly fluidized. At the time when the whole slurry was uniformly fluidized; 4.22 g of LSX powder (ignition loss: 22.5%) dispersed into a small amount of water was added. The amount of LSX added at this time was 0.1% by weight based on LSX formed. The composition of the slurry after the termination of the addition was 3.39 $Na_2O$.1.31 $K_2O$.1.90 $SiO_2$.$Al_2O_3$.74.1 $H_2O$, and the concentration of LSX theoretically formed was 14.7% by weight. Stirring was continued at 100 rpm as such, and aging was conducted at 45° C. for 4 hours. The power required for stirring per unit volume of slurry during the aging was calculated on the basis of the torque applied to a stirring motor. As a result, the power was 0.25 kW/m$^3$. After the aging, the temperature was elevated to 70° C. for one hour while continuing to stir the slurry. After the temperature elevation, stirring was stopped, and crystallization was performed at 70° C. for 8hours. The resulting crystals were filtered, and sufficiently washed with pure water, followed by drying at 70° C. overnight.

Figure 1:
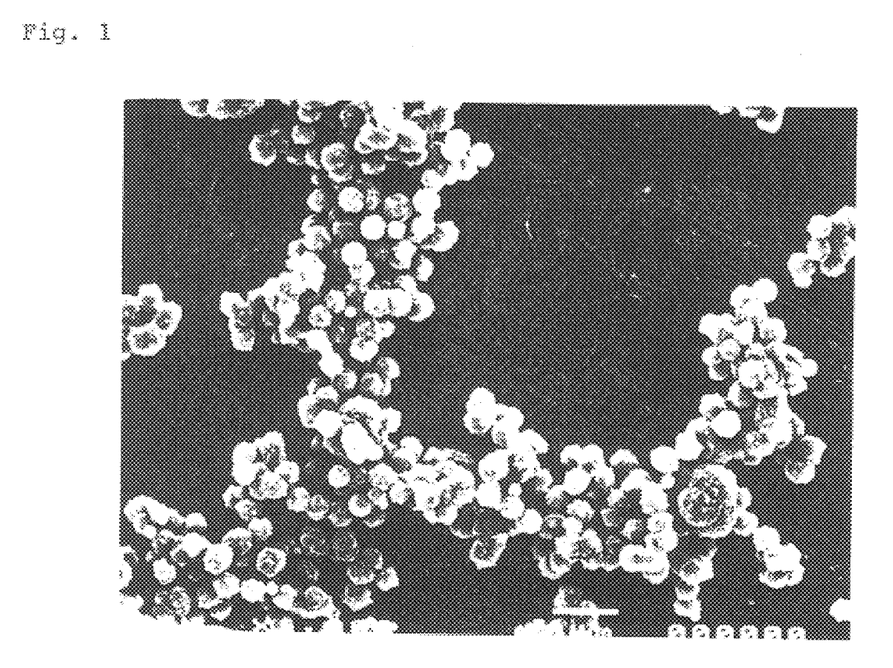
FIG. 1 is a micrograph showing the crystal structure of the powder obtained in Example 1 at ×1,000 magnification under a scanning electron microscope (SEM)
Figure 2:
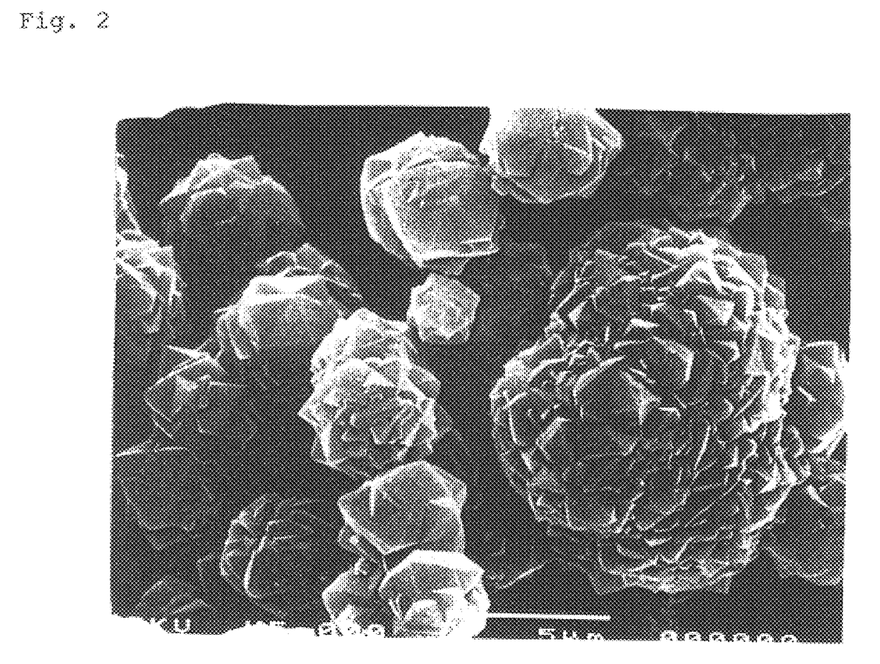
FIG. 2 is a micrograph showing the crystal structure of the powder obtained in Example 1 at ×5,000 magnification under the SEM.

As a result of X-ray diffraction, the resulting LSX powder showed a faujasite type zeolite single phase. Further, as a result of composition analysis, the chemical composition thereof was 0.72 Na$_2$O.0.028 K$_2$O.Al$_2$O$_3$.2.0 SiO$_2$, and the equilibrium water adsorption was 33.4%. Observation of the resulting powder under an SEM scarcely showed an impurity phase, and indicated two peaks in primary particle size. LSX having a particle size of 4 μm accounted for about 99.9% on a particle number basis, and LSX having a particle size of 8 μm accounted for about 0.1% on a particle number basis. Further, the LSX was ion-exchanged to the Na type, and the water adsorption thereof was determined. As a result, it was 35.9%.

EXAMPLE 2

LSX powder was prepared in the same manner as with Example 1 with the exception that the amount of LSX powder to be added was changed to 21.1 g (added in an amount of 0.5% by weight based on LSX formed).

Figure 3:
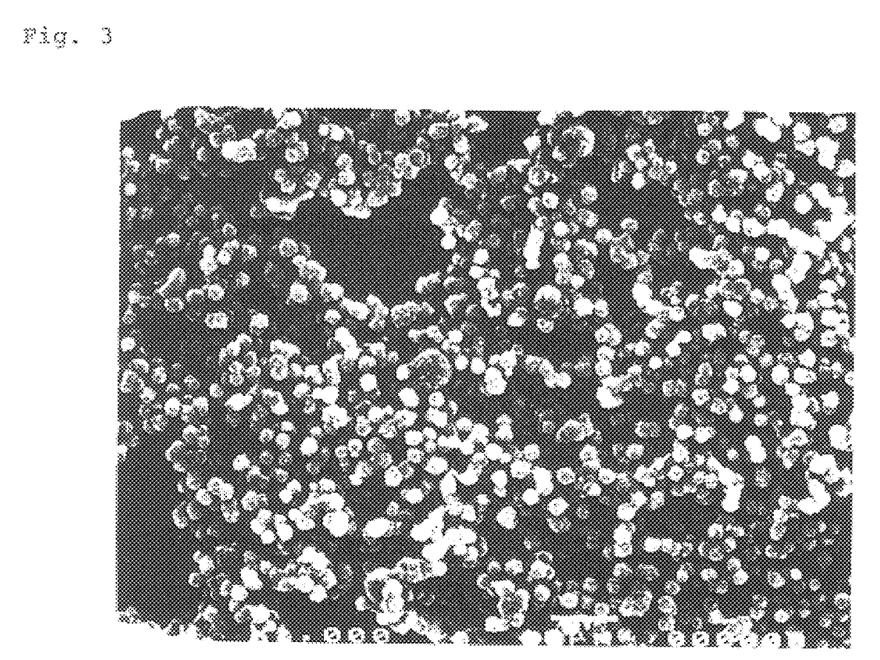
FIG. 3 is a micrograph showing the crystal structure of the powder obtained in Example 2 at ×1,000 magnification under the SEM.
Figure 4:
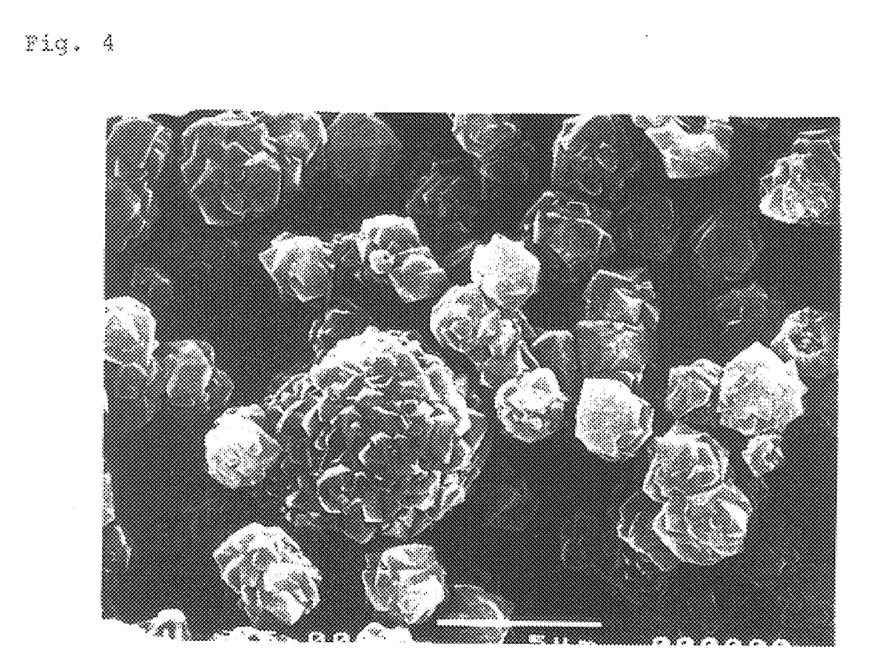
FIG. 4 is a micrograph showing the crystal structure of the powder obtained in Example 2 at ×5,000 magnification under the SEM.

As a result of X-ray diffraction, the resulting LSX powder showed a faujasite type zeolite single phase. Further, as a result of composition analysis, the chemical composition thereof was 0.72 Na$_2$O.0.28 K$_2$O.Al$_2$O$_3$.2.0 SiO$_2$, and the equilibrium water adsorption was 33.6%. Observation of the resulting powder under an SEM scarcely showed an impurity phase, and indicated two peaks in primary particle size. LSX having a particle size of 2.5 μm accounted for about 99.5% on a particle number basis, and LSX having a particle size of 7 μm accounted for about 0.5% on a particle number basis. Further, the LSX was ion-exchanged to the Na type, and the water adsorption thereof was determined. As a result, it was 36.0%.

EXAMPLE 3

LSX powder was prepared in the same manner as with Example 1 with the exception that the aging time is changed to one hour.

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.5%. Observation of the resulting powder under an SEM scarcely showed an impurity phase, and indicated two peaks in primary particle size. LSX having a particle size of 5 μm accounted for about 99.8% on a particle number basis, and LSX having a particle size of 10 μm accounted for only about 0.2% on a particle number basis. Further, the LSX was ion-exchanged to the Na type, and the water adsorption thereof was determined. As a result, it was 35.8%.

EXAMPLE 4

The gelation was carried out under the same conditions as with Example 1, and after the addition of LSX powder, the stirring rotational speed was decreased to 75 rpm. Then, stirring was continued, and aging was conducted at 45° C. for one hour. The whole slurry was slowly flowed, and no staying portion was observed. The power required for stirring per unit volume of slurry during the aging was calculated on the basis of the torque applied to a stirring motor. As a result, the power was 14 kW/m$^3$. After the aging, temperature elevation, crystallization, filtering, washing and drying were performed in the same manner as with Example 1.

As a result of X-ray diffraction, the resulting LSX powder contained a trace amount of A type zeolite, as well as a faujasite type zeolite phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.1%. Observation of the resulting powder under an SEM partly showed A type zeolite, but indicated two peaks in primary particle size. LSX having a particle size of 6 μm accounted for about 99.8% on a particle number basis, and LSX having a particle size of 10 μm accounted for about 0.2% on a particle number basis. Further, the LSX was ion-exchanged to the Na type, and the water adsorption thereof was determined. As a result, it was 35.5%.

EXAMPLE 5

LSX powder was prepared in the same manner as with Example 4 with the exception that the aging time is changed to 4 hours.

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.4%. Observation of the resulting powder under an SEM scarcely showed an impurity phase, and indicated two peaks in primary particle size. LSX having a particle size of 5 μm accounted for about 99.8% on a particle number basis, and LSX having a particle size of 9 μm accounted for about 0.2% on a particle number basis. Further, the LSX was ion-exchanged to the Na type, and the water adsorption thereof was determined. As a result, it was 35.9%.

EXAMPLE 6

The gelation was carried out under the same conditions as with Example 1, and after the addition of LSX powder, the stirring rotational speed was increased to 150 rpm. Then, stirring was continued, and aging was conducted at 45° C. for one hour. The power required for stirring per unit volume of slurry during the aging was calculated on the basis of the torque applied to a stirring motor. As a result, the power was 0.56 kW/m$^3$. After the aging, temperature elevation, crystallization, filtering, washing and drying were performed in the same manner as with Example 1.

As a result of X-ray diffraction, the resulting LSX powder showed a faujasite type zeolite single phase. Further, as a result of composition analysis, the chemical composition thereof was 0.72 Na$_2$O.0.28 K$_2$O.Al$_2$O$_3$.2.0 SiO$_2$, and the equilibrium water adsorption was 33.4%. Observation of the resulting powder under an SEM scarcely showed an impurity phase, and indicated two peaks in primary particle size. LSX having a particle size of 5 μm accounted for about 99.9% on a particle number basis, and LSX having a particle size of 9 μm accounted for about 0.1% on a particle number basis. Further, the LSX was ion-exchanged to the Na type, and the water adsorption thereof was determined. As a result, it was 35.9%.

COMPARATIVE EXAMPLE 1

The gelation was carried out under the same conditions as with Example 1, and after the addition of LSX powder, stirring was stopped. Then, aging was conducted at 45° C. for one hour. After the aging, the resulting slurry was dispensed into a 100-ml polyethylene bottle with cup, and the temperature thereof was elevated in the still standing state by placing it in a dryer heated at 70° C. Then, still standing crystallization was performed at 70° C. for 12 hours, followed by filtering, washing and drying.

As a result of X-ray diffraction, the resulting LSX powder contained a trace amount of A type zeolite, as well as a faujasite type zeolite phase. Further, as a result of composition analysis, the chemical composition thereof was 0.73 $Na_2O.0.27$ $K_2O.Al_2O_3.2.0$ $SiO_2$, and the equilibrium water adsorption was 32.6%. Observation of the resulting powder under an SEM showed a remarkable impurity phase, besides LSX having a particle size of 10 $\mu$m. Further, the LSX was ion-exchanged to the Na type, and the water adsorption thereof was determined. As a result, it was 34.9%.

COMPARATIVE EXAMPLE 2

LSX powder was prepared in the same manner as with Comparative Example 1 with the exception that the aging time is changed to 4 hours.

As a result of X-ray diffraction, the resulting LSX powder contained trace amounts of A type zeolite and E type zeolite, as well as a faujasite type zeolite phase. Further, as a result of composition analysis, the chemical composition thereof was 0.73 $Na_2O.0.27$ $K_2O.Al_2O_3.2.0$ $SiO_2$, and the equilibrium water adsorption was 32.8%. Observation of the resulting powder under an SEM showed a remarkable impurity phase, besides LSX having a particle size of 10 $\mu$m. Further, the LSX was ion-exchanged to the Na type, and the water adsorption thereof was determined. As a result, it was 35.1%.

Examples 3, 4 and 6 show that the weaker stirring strength during the aging reduces the purity of LSX formed, even if the amount of zeolite added and the aging conditions other than the stirring strength are the same. On the other hand, Examples 4 and 5 show that high purity LSX can be obtained by prolonging the aging time, even if the stirring strength during the aging is weak. Further, Example 4 and Comparative Example 1, and Example 5 and Comparative Example 2 show that the addition of zeolite and stirring aging improve the purity of LSX, even if the stirring strength is weak.

EXAMPLE 7

In a stainless reaction vessel having a content volume of 20 liters, 7,350 g of an aqueous solution of sodium silicate ($Na_2O$=3.8% by weight, $SiO_2$=12.6% by weight), 6,000 g of water, 1,850 g of sodium hydroxide (purity: 99%) and 3,570 g of an aqueous solution of potassium hydroxide for industrial use (purity: 48%) were placed, and kept at 45° C. in a water bath with stirring at 100 rpm. Then, 3.9 g of LSX powder (ignition loss: 43%) was added thereto and dispersed therein. The amount of LSX added at this time was 0.1% by weight based on LSX formed. To this solution, 3,666 g of an aqueous solution of sodium aluminate ($Na_2O$=20.0% by weight, $Al_2O_3$=22.5% by weight) kept at 35° C. was added for one minute. From immediately after the addition, the resulting solution became clouded to initiate gelation. Immediately before the termination of the addition, the viscosity of the whole gel increased, and the gel started to stay partly in an upper portion of the reaction vessel. However, after about 1 minute, the whole was uniformly fluidized. The composition of the slurry after the termination of the addition was 4.88 $Na_2O.1.91$ $K_2O.1.90$ $SiO_2.Al_2O_3.115$ $H_2O$, and the concentration of LSX theoretically formed was 10.0% by weight. Stirring was continued at 100 rpm as such, and aging was conducted at 45° C. for 4 hours. The power required for stirring per unit volume of slurry during the aging was calculated on the basis of the torque applied to a stirring motor. As a result, the power was 0.20 kW/m$^3$. After the aging, the temperature was elevated to 70° C. for one hour while continuing to stir the slurry. After the temperature elevation, stirring was stopped, and crystallization was performed at 70° C. for 6 hours. The resulting crystals were filtered, and sufficiently washed with pure water, followed by drying at 70° C. overnight.

As a result of X-ray diffraction, the resulting LSX powder contained trace amounts of A type zeolite and E type zeolite, as well as a faujasite type zeolite phase. Further, as a result of composition analysis, the chemical composition thereof was 0.72 $Na_2O.0.28$ $K_2O.Al_2O_3.2.0$ $SiO_2$, and the equilibrium water adsorption was 33.0%. Further, the LSX was ion-exchanged to the Na type, and the water adsorption thereof was determined. As a result, it was 35.5%.

EXAMPLE 8

LSX powder was prepared in the same manner as with Example 7 with the exception that the aging time is changed to 12 hours.

As a result of X-ray diffraction, the resulting LSX powder showed a faujasite type zeolite single phase. Further, as a result of composition analysis, the chemical composition thereof was 0.72 $Na_2O.0.28$ $K_2O.Al_2O_3.2.0$ $SiO_2$, and the equilibrium water adsorption was 33.2%. Observation of the resulting powder under an SEM slightly showed an impurity phase, but indicated two peaks in primary particle size. LSX having a particle size of 5 $\mu$m accounted for about 99.9% on a particle number basis, and LSX having a particle size of 9 $\mu$m accounted for about 0.1% on a particle number basis. Further, the LSX was ion-exchanged to the Na type, and the water adsorption thereof was determined. As a result, it was 35.7%.

EXAMPLE 9

In a stainless reaction vessel having a content volume of 20 liters, 7,350 g of an aqueous solution of sodium silicate ($Na_2O$=3.8% by weight, $SiO_2$=12.6% by weight), 6,000 g of water, 1,850 g of sodium hydroxide (purity: 99%) and 3,570 g of an aqueous solution of potassium hydroxide for industrial use (purity: 48%) were placed, and kept at 40° C. in a water bath with stirring at 100 rpm. To this solution, 3,666 g of an aqueous solution of sodium aluminate ($Na_2O$=20.0% by weight, $Al_2O_3$=22.5% by weight) kept at 35° C. was added for one minute. From immediately after the addition, the resulting solution became clouded to initiate gelation. Immediately before the termination of the addition, the viscosity of the whole gel increased, and the gel started to stay partly in an upper portion of the reaction vessel. However, after about one minute, the whole was uniformly fluidized. At the time when the whole slurry was uniformly fluidized, 3.9 g of LSX powder (ignition loss: 43%) dispersed into a small amount of water was added. The amount of LSX added at this time was 0.1% by weight based on LSX formed. The composition of the slurry after the termination of the addition was 4.88 $Na_2O.1.91$ $K_2O.1.90$ $SiO_2.Al_2O_3.115$ $H_2O$, and the concentration of LSX theoretically formed was 10.0% by weight. Stirring was continued at 100 rpm as such, and aging was conducted at 45° C. for 4 hours. The power required for stirring per unit volume of slurry during the aging was calculated on the basis of the torque applied to a stirring motor. As a result, the power was 0.20 kW/m$^3$. After the aging, the temperature was elevated to 70° C. for one hour while continuing to stir the slurry. After the temperature elevation, stirring was stopped, and crystallization was performed at 70° C. for 4 hours. The resulting crystals were filtered, and sufficiently washed with pure water, followed by drying at 70° C. overnight.

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.4%. Observation of the resulting powder under an SEM scarcely showed an impurity phase, and indicated two peaks in primary particle size. LSX having a particle size of 5 μm accounted for about 99.9% on a particle number basis, and LSX having a particle size of 10 μm accounted for about 0.1% on a particle number basis. Further, the LSX was ion-exchanged to the Na type, and the water adsorption thereof was determined. As a result, it was 35.9%.

EXAMPLE 10

LSX powder was prepared in the same manner as with Example 9 with the exception that the amount of LSX powder (ignition loss: 43%) to be added was changed to 39 g (added in an amount of 1.0% by weight based on LSX formed).

As a result of X-ray diffraction, the resulting LSX powder showed a faujasite type zeolite single phase. Further, as a result of composition analysis, the chemical composition thereof was 0.72 Na$_2$O.0.28 K$_2$O.Al$_2$O$_3$.2.0 SiO$_2$, and the equilibrium water adsorption was 33.4%. Observation of the resulting powder under an SEM scarcely showed an impurity phase, and indicated two peaks in primary particle size. LSX having a particle size of 2 μm accounted for about 99.2% on a particle number basis, and LSX having a particle size of 6 μm accounted for about 0.8% on a particle number basis. Further, the LSX was ion-exchanged to the Na type, and the water adsorption thereof was determined. As a result, it was 35.9%.

EXAMPLE 11

LSX powder was prepared in the same manner as with Example 9 with the exception that the amount of LSX powder to be added was changed to 0.39 g (ignition loss: 43%; added in an amount of 0.01% by weight based on LSX formed).

As a result of X-ray diffraction, the resulting LSX powder contained a trace amount of A type zeolite, as well as a faujasite type zeolite phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.0%. Observation of the resulting powder under an SEM showed A type zeolite, but indicated two peaks in primary particle size. LSX having a particle size of 7 μm accounted for about 99.98% on a particle number basis, and LSX having a particle size of 10 μm accounted for about 0.02% on a particle number basis. Further, the LSX was ion-exchanged to the Na type, and the water adsorption thereof was determined. As a result, it was 35.9%.

EXAMPLE 12

LSX powder was prepared in the same manner as with Example 11 with the exception that the aging time is changed to 16 hours.

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.5%. Observation of the resulting powder under an SEM scarcely showed an impurity phase, and indicated two peaks in primary particle size. LSX having a particle size of 4 μm accounted for about 99.99% on a particle number basis, and LSX having a particle size of 8 μm accounted for about 0.01% on a particle number basis. Further, the LSX was ion-exchanged to the Na type, and the water adsorption thereof was determined. As a result, it was 36.0%.

EXAMPLE 13

LSX powder was prepared in the same manner as with Example 12 with the exception that zeolite to be added was changed to A type zeolite powder and the amount of LSX powder to be added was changed to 0.29 g (ignition loss: 22%; added in an amount of 0.01% by weight based on LSX formed).

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.5%. Observation of the resulting powder under an SEM scarcely showed an impurity phase, and indicated two peaks in primary particle size. LSX having a particle size of 4 μm accounted for about 99.99% on a particle number basis, and LSX having a particle size of 8 μm accounted for about 0.01% on a particle number basis. Further, the LSX was ion-exchanged to the Na type, and the water adsorption thereof was determined. As a result, it was 36.0%.

EXAMPLE 14

LSX powder was prepared in the same manner as with Example 9 with the exception that zeolite to be added was changed to Y type zeolite powder (SiO$_2$/Al$_2$O$_3$ molar ratio: 3.4) and the amount of LSX powder to be added was changed to 3.0 g (ignition loss: 26%; added in an amount of 0.1% by weight based on LSX formed).

As a result of X-ray diffraction, the resulting LSX powder showed a faujasite type zeolite single phase. Further, as a result of composition analysis, the chemical composition thereof was 0.73 Na$_2$O.0.27 K$_2$O.Al$_2$O$_3$.2.0 SiO$_2$, and the equilibrium water adsorption was 33.2%. Observation of the resulting powder under an SEM scarcely showed an impurity phase, and indicated two peaks in primary particle size. LSX having a particle size of 4 μm accounted for about 99.8% on a particle number basis, and LSX having a particle size of 8 μm accounted for about 0.2% on a particle number basis. Further, the LSX was ion-exchanged to the Na type, and the water adsorption thereof was determined. As a result, it was 35.7%.

COMPARATIVE EXAMPLE 3

LSX powder was prepared in the same manner as with Example 7 with the exception that no LSX was added at all.

As a result of X-ray diffraction, the structure of the resulting crystal powder was mainly faujasite type zeolite, and trace amounts of A type zeolite, E type zeolite and a phase which could not be clearly identified were observed. Further, as a result of composition analysis, the chemical composition thereof was 0.73 Na$_2$O.0.27 K$_2$O.Al$_2$O$_3$.2.0

$SiO_2$, and the equilibrium water adsorption was 32.6%. Observation of the resulting powder under an SEM showed a remarkable impurity phase, besides LSX having a particle size of 10 μm. Further, the LSX was ion-exchanged to the Na type, and the water adsorption thereof was determined. As a result, it was 34.9%.

COMPARATIVE EXAMPLE 4

LSX powder was prepared in the same manner as with Comparative Example 3 with the exception that the aging time was changed to 24 hours.

As a result of X-ray diffraction, the structure of the resulting crystal powder was a faujasite type zeolite single phase. The chemical composition thereof was 0.73 $Na_2O.0.27 K_2O.Al_2O_3.2.0 SiO_2$, and the equilibrium water adsorption was 33.3%. Observation of the resulting powder under an SEM showed a slight impurity phase and only one peak in primary particle size of LSX, and LSX having a particle size of 5 μm accounted for almost all. Further, the LSX was ion-exchanged to the Na type, and the water adsorption thereof was determined. As a result, it was 35.7%.

The LSX obtained in Example 7 is somewhat low in purity, but larger in water adsorption than one obtained in Comparative Example 3. This shows that zeolite added achieves the effect of enhancing the formation of LSX.

Examples 7 and 9 indicate that high purity LSX is more effectively obtained by adding zeolite after the mixing of the aluminate-containing solution with the silicate-containing solution and the gelation.

Examples 11 and 12 show that the addition of zeolite has the effect of enhancing the formation of LSX, even if the amount of zeolite added is very slight.

Examples 13 and 14 indicate that in respect to the kind of zeolite, not only LSX, but also zeolite having the same faujasite structure and further A type zeolite of the different kind have also the effect of enhancing the formation of LSX.

As shown in Comparative Examples 3 and 4, high purity LSX can also be obtained by methods other than the present invention. However, these methods require the aging for a long period of time, so that they are poor in productivity. Further, the resulting LSX particles have one peak in primary particle size, and differ from the LSX particles of the present invention having two peaks in primary particles size.

EXAMPLE 15

In a stainless reaction vessel having a content volume of 20 liters, 12,390 g of an aqueous solution of sodium silicate ($Na_2O$=3.8% by weight, $SiO_2$=12.6% by weight), 1,020 g of water, 1,025 g of sodium hydroxide (purity: 99%) and 1,772 g of an aqueous solution of potassium hydroxide for industrial use (purity: 95%) were placed, and kept at 40° C. in a water bath with stirring at 100 rpm. To this solution, 6,250 g of an aqueous solution of sodium aluminate ($Na_2O$=20.0% by weight, $Al_2O_3$=22.5% by weight) kept at 35° C. was added for 1.5 minutes. From immediately after the addition, the resulting solution became clouded to initiate gelation. Immediately before the termination of the addition, the viscosity of the whole gel increased, and the gel started to stay partly in an upper portion of the reaction vessel. However, after about 5 minutes, the whole was uniformly fluidized. At the time when the whole slurry was uniformly fluidized, 4.81 g of LSX powder (ignition loss: 22.5%) dispersed into a small amount of water was added. The amount of LSX added at this time was 0.1% by weight based on LSX formed. The composition of the slurry after the termination of the addition was 2.94 $Na_2O.1.15 K_2O.1.89 SiO_2.Al_2O_3.62.3 H_2O$, and the concentration of LSX theoretically formed was 16.9% by weight. Stirring was continued at 100 rpm as such, and aging was conducted at 45° C. for 6 hours. The power required for stirring per unit volume of slurry during the aging was calculated on the basis of the torque applied to a stirring motor. As a result, the power was 0.30 $kW/m^3$. After the aging, the temperature was elevated to 70° C. for one hour while continuing to stir the slurry. After the temperature elevation, stirring was stopped, and crystallization was performed at 70° C. for 8 hours. The resulting crystals were filtered, and sufficiently washed with pure water, followed by drying at 70° C. overnight.

As a result of X-ray diffraction, the resulting LSX powder showed a faujasite type zeolite single phase. Further, as a result of composition analysis, the chemical composition thereof was 0.73 $Na_2O.0.27 K_2O.Al_2O_3.2.0 SiO_2$, and the equilibrium water adsorption was 33.2%. Observation of the resulting powder under an SEM scarcely showed an impurity phase, and indicated two peaks in primary particle size. LSX having a particle size of 3 μm accounted for about 99.9% on a particle number basis, and LSX having a particle size of 8 μm accounted for about 0.1% on a particle number basis. Further, the LSX was ion-exchanged to the Na type, and the water adsorption thereof was determined. As a result, it was 35.7%.

EXAMPLE 16

LSX powder was prepared in the same manner as with Example 9 with the exception that the temperature of the reaction vessel during the gelation was changed to 60° C., the temperature of the aqueous solution of sodium aluminate added was changed to 55° C., the aging temperature was changed to 60° C. and the aging time was changed to 2 hours.

As a result of X-ray diffraction, the resulting LSX powder showed a faujasite type zeolite single phase. Further, as a result of composition analysis, the chemical composition thereof was 0.73 $Na_2O.0.27 K_2O.Al_2O_3.2.0 SiO_2$, and the equilibrium water adsorption was 33.4%. Observation of the resulting powder under an SEM scarcely showed an impurity phase, and indicated two peaks in primary particle size. LSX having a particle size of 5 μm accounted for about 99.8% on a particle number basis, and LSX having a particle size of 10 μm accounted for about 0.2% on a particle number basis. Further, the LSX was ion-exchanged to the Na type, and the water adsorption thereof was determined. As a result, it was 35.9%.

EXAMPLE 17

In a stainless reaction vessel having a content volume of 20 liters, 3,666 g of an aqueous solution of sodium aluminate ($Na_2O$=20.0% by weight, $Al_2O_3$=22.5% by weight), 6,000 g of water, 1,850 g of sodium hydroxide (purity: 99%) and 3,570 g of an aqueous solution of potassium hydroxide for industrial use (purity: 48%) were placed, and kept at 40° C. in a water bath with stirring at 100 rpm. To this solution, 7,350 g of an aqueous solution of sodium silicate ($Na_2O$= 3.8% by weight, $SiO_2$=12.6% by weight) kept at 35° C. was added for 4 minutes. After about 1.5 minutes from the initiation of the addition, the resulting solution became clouded to initiate gelation. Immediately before the termination of the addition, the viscosity of the whole gel increased, but the whole was uniformly fluidized. One minute after the termination of the addition of sodium silicate, 2.89 g of LSX powder (ignition loss: 22.5%) dispersed into a small amount of water was added. The amount of LSX added at this time was 0.1% by weight based on LSX formed. Stirring was continued at 100 rpm as such, and the aging was conducted at 40° C. for 6 hours. After the aging, the temperature was elevated to 70° C. for one hour while continuing to stir the slurry. After the temperature elevation, stirring was stopped, and crystallization was performed at 70° C. for 8 hours. The resulting crystals were filtered, and sufficiently washed with pure water, followed by drying at 70° C. overnight.

As a result of X-ray diffraction, the resulting LSX powder showed a faujasite type zeolite single phase. Further, as a result of composition analysis, the chemical composition thereof was 0.73 $Na_2O.0.27$ $K_2O.Al_2O_3.2.0$ $SiO_2$, and the equilibrium water adsorption was 33.0%. Observation of the resulting powder under an SEM scarcely showed an impurity phase, and indicated two peaks in primary particle size. LSX having a particle size of 7 $\mu$m accounted for about 99.9% on a particle number basis, and LSX having a particle size of 10 $\mu$m accounted for about 0.1% on a particle number basis. Further, the LSX was ion-exchanged to the Na type, and the water adsorption thereof was determined. As a result, it was 35.5%.

EXAMPLE 18

LSX powder was prepared in the same manner as with Example 1 with the exception that the crystallization was conducted with stirring at 100 rpm for 5 hours.

As a result of X-ray diffraction, the resulting LSX powder showed a faujasite type zeolite single phase. Further, as a result of composition analysis, the chemical composition thereof was 0.73 $Na_2O.0.27$ $K_2O.Al_2O_3.2.0$ $SiO_2$, and the equilibrium water adsorption was 33.1%. Observation of the resulting powder under an SEM scarcely showed an impurity phase, and indicated two peaks in primary particle size, although the particle size distribution was wide. LSX having a central particle size value of 2.5 $\mu$m accounted for about 99.9% on a particle number basis, and LSX having a particle size of 7 $\mu$m accounted for about 0.1% on a particle number basis. Further, the LSX was ion-exchanged to the Na type, and the water adsorption thereof was determined. As a result, it was 35.6%.

EXAMPLE 19

In a stainless reaction vessel having a content volume of 35 $m^3$, 10.7 $m^3$ of an aqueous solution of sodium silicate ($Na_2O$=3.8% by weight, $SiO_2$=12.6% by weight), 6.7 $m^3$ of water, 4.2 $m^3$ of sodium hydroxide (purity: 48%) and 3.9 $m^3$ of an aqueous solution of potassium hydroxide for industrial use (purity: 48%) were placed, and kept at 45° C. with stirring at 120 rpm by use of a pitched blade paddle. To this solution, 4.1 $m^3$ of an aqueous solution of sodium aluminate ($Na_2O$=20.0% by weight, $Al_2O_3$=22.5% by weight) kept at 40° C. was added for one minute. Five minutes after the termination of the addition of the aqueous solution of sodium aluminate, 4.8 kg of LSX powder (ignition loss: 22.5%) dispersed into a small amount of water was added. Stirring was continued at 120 rpm as such, and aging was conducted at 45° C. for 3 hours. The power required for stirring per unit volume of slurry during the aging was 1.2 kW/$m^3$. After the aging, the temperature was elevated to 70° C. for one hour while continuing to stir the slurry. After the temperature elevation, stirring was stopped, and crystallization was performed at 70° C. for 4 hours. The resulting crystals were filtered, and sufficiently washed with pure water, followed by drying at 70° C. overnight.

As a result of X-ray diffraction, the resulting LSX powder showed a faujasite type zeolite single phase. Further, as a result of composition analysis, the chemical composition thereof was 0.72 $Na_2O.0.28$ $K_2O.Al_2O_3.2.0$ $SiO_2$, and the equilibrium water adsorption was 33.3%. Observation of the resulting powder under an SEM scarcely showed an impurity phase, and indicated two peaks in primary particle size. LSX having a particle size of 4 $\mu$m accounted for about 99.9% on a particle number basis, and LSX having a particle size of 8 $\mu$m accounted for about 0.1% on a particle number basis. Further, the LSX was ion-exchanged to the Na type, and the water adsorption thereof was determined. As a result, it was 35.8%.

According to the present invention, the extremely high purity LSX which has been difficult to obtain by the prior art can be provided. Further, the high purity LSX can be synthesized for a short period of time, and particularly, the time of the aging stage requiring a long period of time in the reaction process can be shortened. Accordingly, the high purity LSX can be produced on a large scale for a short period of time, so that the industrially useful manufacturing method can be provided.

What is claimed is:

1. High purity low-silica faujasite type zeolite showing a faujasite single phase on X-ray diffraction, having a $SiO_2$/$Al_2O_3$ molar ratio of 1.9 to 2.1 and a water adsorption of 35.0% by weight or more when converted to the Na type, and comprising particles having smaller primary particle size and particles having larger primary particle size, wherein the primary particle size of the smaller particles is from 1 $\mu$m to 8 $\mu$m, the primary particle size of the larger particles is from 5 $\mu$m to 15 $\mu$m, and the particles having the smaller primary particle size account for 90% or more of the total particle number.

2. A method for producing the low-silica faujasite type zeolite according to claim 1, comprising mixing an aluminate-containing solution with a silicate-containing solution and allowing the resulting solution to gel, followed by aging and crystallization, wherein besides zeolite formed, zeolite is added before the termination of the aging.

3. The method according to claim 2, wherein zeolite is added after the termination of the gelation or at the beginning of the aging.

4. The method according to claim 2 or 3, wherein zeolite to be added is faujasite type zeolite and/or A type zeolite.

5. The method according to claim 4, wherein zeolite to be added is faujasite type zeolite, and the amount thereof added is 0.001% to 10% by weight based on low-silica faujasite type zeolite formed.

6. The method according to claim 4, wherein zeolite to be added is A type zeolite, and the amount thereof added is 0.001% to 1% by weight based on low-silica faujasite type zeolite formed.

7. The method according to claim 5, wherein the aging is conducted under stirring at a power required for stirring per unit volume of slurry of 0.1 kW/$m^3$ or more.

8. The method according to claim 7, wherein the aging time is 0.5 hour to 10 hours.

9. The method according to claim 8, wherein the composition after the mixing of the aluminate-containing solution with the silicate-containing solution is 12.5% to 20% by weight in the concentration of low-silica faujasite theoretically formed.

* * * * *